United States Patent
Ooya

(10) Patent No.: US 9,290,137 B2
(45) Date of Patent: Mar. 22, 2016

(54) POWER SUPPLY CIRCUIT FOR VEHICLE

(75) Inventor: Tatsuyuki Ooya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 392 days.

(21) Appl. No.: 13/882,458

(22) PCT Filed: Sep. 15, 2011

(86) PCT No.: PCT/JP2011/071087
§ 371 (c)(1),
(2), (4) Date: Apr. 29, 2013

(87) PCT Pub. No.: WO2012/056823
PCT Pub. Date: May 3, 2012

(65) Prior Publication Data
US 2013/0207457 A1  Aug. 15, 2013

(30) Foreign Application Priority Data

Oct. 29, 2010  (JP) ................... 2010-243892

(51) Int. Cl.
*B60R 16/033* (2006.01)
*H02J 7/00* (2006.01)

(52) U.S. Cl.
CPC *B60R 16/033* (2013.01); *H02J 7/00* (2013.01)

(58) Field of Classification Search
CPC  B60R 16/033; B60R 16/023; B60R 16/0235; B60R 16/0239; B60R 16/03; B60R 16/04; B60R 16/005–16/0215; B60R 16/00; B64D 41/00–41/007; B60L 1/00–1/20; H02J 7/00
USPC ................................. 307/9.1–10.8
See application file for complete search history.

(56) References Cited

U.S. PATENT DOCUMENTS

| 5,554,966 A * | 9/1996 | Iijima | G08B 21/00 307/10.2 |
| 5,838,075 A * | 11/1998 | Yamasaki | B60R 25/04 180/287 |
| 6,629,050 B2 * | 9/2003 | Modgil | B60R 25/04 180/287 |
| 2003/0222499 A1 * | 12/2003 | Ely et al. | 307/10.1 |
| 2011/0115427 A1 * | 5/2011 | Morita et al. | 320/107 |

FOREIGN PATENT DOCUMENTS

| JP | 2002-175124 A | 6/2002 |
| JP | 2006-166644 A | 6/2006 |
| JP | 2010-233284 A | 10/2010 |

* cited by examiner

*Primary Examiner* — Jared Fureman
*Assistant Examiner* — James P Evans
(74) *Attorney, Agent, or Firm* — McDermott Will & Emery LLP

(57) ABSTRACT

Disclosed is a power supply circuit for vehicles, which can continuously supply a constant voltage without a complicated circuit configuration, even during a time when a surge voltage is applied (abnormal voltage time). The power supply circuit is provided with: a constant voltage circuit, which is connected to a battery mounted in a vehicle, and which outputs a predetermined voltage; a surge cut circuit, which is provided with a Zener diode and a transistor for protecting the constant voltage circuit; and a switching circuit, which is disposed between the constant voltage circuit and the surge cut circuit, and which performs on/off switching of output to the constant voltage circuit. The power supply circuit is also provided with a feedback line that connects the connecting line (output line) of the switching circuit and the Zener diode to each other.

2 Claims, 2 Drawing Sheets

POWER SUPPLY CIRCUIT FOR VEHICLE

RELATED APPLICATIONS

This application is the U.S. National Phase under 35 U.S.C. §371 of International Application No. PCT/JP2011/071087, filed on Sep. 15, 2011, which in turn claims the benefit of Japanese Application No. 2010-243892, filed on Oct. 29, 2010, the disclosures of which Applications are incorporated by reference herein.

TECHNICAL FIELD

The present invention relates to a power supply circuit which is mounted on a vehicle, and is for electric devices of the vehicle.

BACKGROUND ART

A vehicle has a battery mounted thereon as a power source for its electric devices, and is provided with a power supply circuit for providing a predetermined constant voltage to electric devices, regardless of the state of the battery. Meanwhile, electromagnetically induced noises and surges generated from an actuator, relay and solenoid controlled by an ignition device or an electronic control device are often superposed on a power source line of the battery which provides power to electronically controlled devices. It is therefore important to remove and reduce these noises and surges generated in the power source line of the battery to prevent the malfunction and damage of the electronically control devices, and improve their reliability.

To this end, a constitution in which a surge-preventing circuit, a switching circuit, and a constant voltage circuit (smoothing circuit) are sequentially connected to the battery power source is employed, and is disclosed in, for example, patent document 1. In these power supply circuits, a constitution in which the surge-preventing circuit functions to turn off the switching circuit when a surge is applied to keep the constant voltage circuit from operating has been used.

PRIOR ART DOCUMENT

Patent Document

Patent document 1: Japanese Unexamined Patent Publication No. 2002-175124

SUMMARY OF THE INVENTION

Problems to be Solved by the Invention

In the above-mentioned electric device which is as the target of supply of a constant voltage from the power supply circuit, functions which allow the user of the vehicle to select desired modes and various settings are provided. For example, display devices for vehicles, have functions for switching between operation conditions such as power mode and ecology mode. It should be noted that the selected mode is stored in a storage medium as setting information.

However, in a conventional power supply circuit, power supply is turned off when a surge is applied (when there is an abnormal voltage), and the setting information cannot be stored in a storage medium. Therefore, the setting is initialized each time a surge is applied, and resetting by the user of the vehicle is required, which leads to complication.

As a solution to the above-mentioned problems, a constitution in which the storage medium continuously operates even when a surge is applied by providing a storage means with a dedicated power supply circuit separately is possible, but it causes the problems that the number of electronic parts are increased and that the circuit constitution such as the wiring structure is complicated.

To this end, the present invention was made in view of the above-mentioned problems, and an object of the same is to provide a power supply circuit for vehicle a constant voltage can be continuously provided even when a surge is applied without complicating its circuit constitution.

Means for Solving the Problem

The power supply circuit for vehicle of the present invention comprising: a constant voltage circuit which is connected to a battery mounted on a vehicle and outputs a predetermined voltage; a surge cut circuit provided with a Zener diode and a transistor for protecting the constant voltage circuit; and a switching circuit which switches an output to the constant voltage circuit on and off between the constant voltage circuit and the surge cut circuit, wherein the power supply circuit for vehicle comprising a feedback line which connects an output line of the switching circuit and the Zener diode.

Moreover, a feature of the constant voltage circuit is to provide power source to a load circuit which includes a storage medium storing setting information.

Moreover, a feature of the switching circuit is to perform the switching on and off based on the operation of a starting switch of the vehicle.

Effect of the Invention

The power supply circuit for vehicle of the present invention relates to a power supply circuit for an electric device mounted on a vehicle, by which a constant voltage can be continuously provided even when a surge is applied without complicated circuit constitution.

BEST MODES FOR CARRYING OUT THE INVENTION

Embodiments to which the present invention is applied will be described below with reference to the accompanying drawings.

Figure 1:
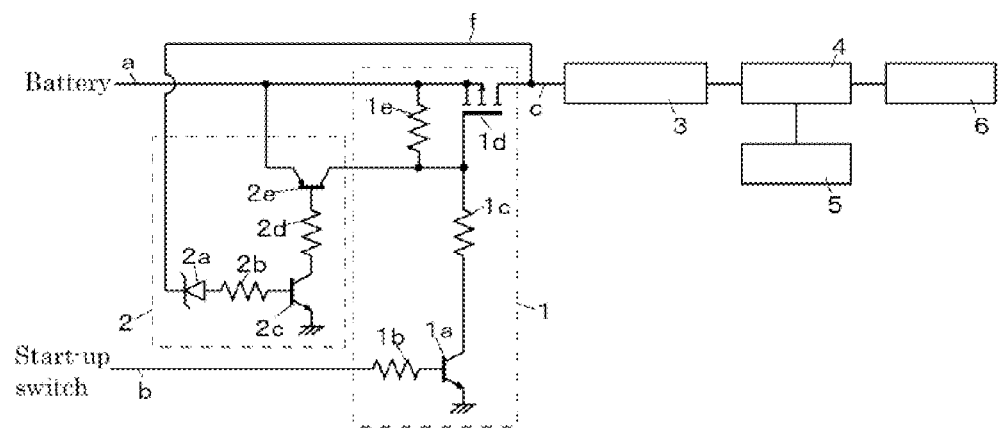
FIG. 1 is a drawing which shows an electrical constitution in an embodiment of the present invention.

FIG. 1 is a drawing which shows a circuit constitution including a power supply circuit of a meter for vehicles, which includes a power supply circuit including a switching circuit 1, a surge cut circuit 2, and a constant voltage circuit 3; a control means 4; and a storage means (storage medium) 5.

The switching circuit 1 is connected to a power source line a from the battery, and based on a start-up switch (ignition switch) of the vehicle, switches on or off whether or not to provide the power source provided from the battery to a constant voltage circuit 3.

The switching circuit 1 is provided with an NPN-type transistor $1a$, a resistor $1b$ which limits a base current of the NPN transistor 1a when the start-up switch is operated on an input line b, a resistor 1c which limits a collector current of the NPN-type transistor 1a, a P-channel FET (field effect transistor) 1d to which the resistor 1c and the gate are connected, and a resistor 1e which applies an on-state potential between the gate and the source of the P-channel FET 1d, provide. When the start-up switch is turned on, a current flows between the source and the drain of the P-channel FET 1d, and the battery and the constant voltage circuit 3 are electrically connected.

The surge cut circuit 2 is a circuit including a Zener diode 2a for removing surge superposition on the power source line from the battery. Moreover, the circuit 2 is provided the Zener diode 2a which branches from a connecting line (an output line) c connected to the drain of the P-channel FET 1d and which connects to the cathode a voltage that is fed back, a resistor 2b which limits a current flowing to the Zener diode 2a, a NPN-type transistor 2c to which a base current is provided from this resistor 2b, a resistor 2d which limits the collector current of the NPN-type transistor 2c, a PNP-type transistor 2e which flows a current between the battery the gate of the P-channel FET 1d by inputting the collector current of the NPN-type transistor 2c into the base.

Figure 2:
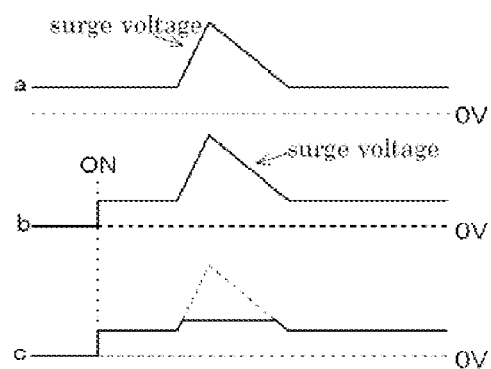
FIG. 2 is a drawing which shows an example of the output waveform when a surge is applied in the same embodiment.

It should be noted that the surge cut circuit 2 is configured to, when the P-channel FET 1d is controlled to be turned off so that a drain potential lowers, constitutes a feedback line f which prompt to return the P-channel FET 1d to the on control. Therefore, can keep providing a voltage in a predetermined range to the constant voltage circuit 3 while cutting the surge, and can form the waveforms of the lines a, b, c as shown in FIG. 2. Therefore, by the surge cut circuit 2, in a state that the start-up switch is turned on, even when a surge voltage is applied to a power source line a and the input line b, a surge equal to or higher than a predetermined voltage set in the Zener diode 2a can be cut, and a voltage can be outputted to the constant voltage circuit 3 without exceeding the upper limit of an allowable voltage of the constant voltage circuit 3.

As the constant voltage circuit 3, a DC/DC converter or a regulator can be applied. The constant voltage circuit 3 inputs power from the in-vehicle battery via the switching circuit 1 and other components, and produces and outputs a predetermined voltage suitable for the constitution of the load side.

The control means 4, for which a microcomputer can be applied, operates based on a drive voltage provided from the constant voltage circuit 3, and produces and outputs a control signal to control a display means 6 based on inputs such as vehicle information. In this case, the control means 4 is provided with storage units such as ROM and RAM (not shown) used for storing predetermined programs and various data and as storage areas and the like in calculation, a CPU for performing arithmetic processing according to the predetermined program, an input/output interface and the like. The control means 4 inputs an operation signal by the user of the vehicle, and vehicle information based on various sensors of the vehicle via a dedicated cable, and controls the display means 6 depending on these signals.

For example, the control means 4 is started by turning on the start-up switch to provide the drive voltage, and outputs a control signal which prompts the display means 6 to display and output vehicle information such as the speed of the vehicle, warnings, and indicators.

The storage means 5 is a storage medium for storing setting information and the like selected by the user of the vehicle such as various information concerning the vehicle and the operation mode of the vehicle, in this case, an external memory connected to the control means 4 such as EEPROM and flash memory is applied. It should be noted that the storage means 5 can also serve as a storage unit provided in the control means 4.

The display means 6 indicates vehicle information and the like based on the control signal from the control means 4. For the display means 6, a pointer system meter which indicates measured values by performing comparative reading by means of a pointer rotated by a driving force such as a motor and an index part which is the target of indication of this pointer, and a display device such as a liquid crystal panel and an organic EL panel can be applied.

Figure 3:
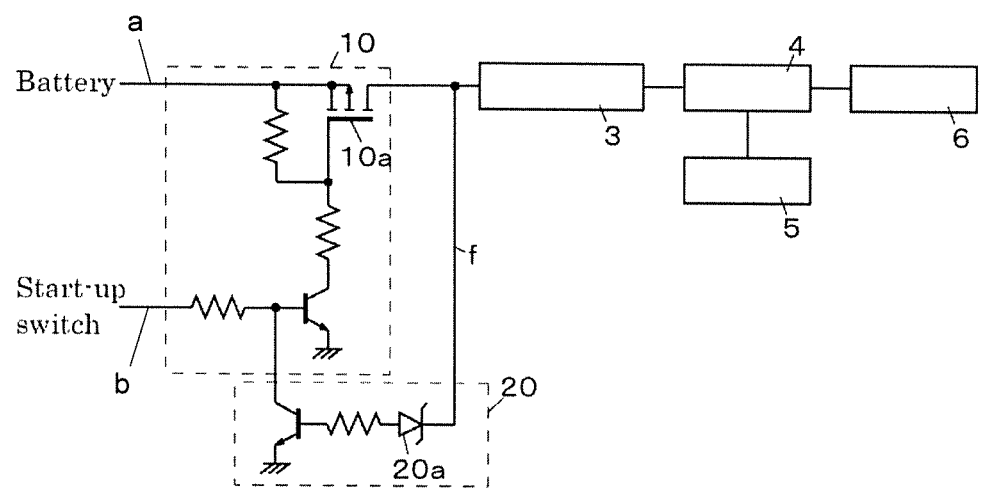
FIG. 3 is a drawing which shows another example of the same embodiment.

Moreover, in order to realize the function similar to the embodiment shown in FIG. 1, the circuit constitution as shown in FIG. 3 can be also applied, and a voltage can be continuously provided by the switching circuit 10 and the surge cut circuit 20 while cutting the surge to the constant voltage circuit 3.

In addition, the switching circuit 10 is electrically connected the battery and the constant voltage circuit 3 by turning on between the source and drain of the P-channel FET 10a when the start-up switch is turned on. Moreover, the surge cut circuit 20 controls to turn off the P-channel FET 10a with a predetermined voltage set by the Zener voltage of a Zener diode 20a when a surge occurs in the input from the battery and the drain potential of the P-channel FET 10a increases. Therefore, when there is an input involving a surge, an output similar to the waveform shown in FIG. 2 can be made.

Such the power supply circuit for the vehicle, which includes the constant voltage circuit 3 connected to a battery mounted on a vehicle and outputs a predetermined voltage, the surge cut circuit 2 provided with the Zener diode 2a and the transistor 2c for protecting the constant voltage circuit 3, and the switching circuit 1 which switches the output to the constant voltage circuit 3 on and off between the constant voltage circuit 3 and the surge cut circuit 2, the power supply circuit for the vehicle includes the feedback line f which connects a connecting line (output line) c of the switching circuit 1 and the Zener diode 2a.

Therefore, there is provided a power supply circuit for vehicle which can continuously provide a constant voltage even (when there is an abnormal voltage) when a surge is applied without complicated circuit constitution.

Moreover, the constant voltage circuit 3 can store and retain information by providing the power to a load circuit including the storage means (storage medium) 5 storing setting information even in such a state that a surge is applied.

Moreover, in the switching circuit 1, by the switching on/off based on the operation of the start-up switch of the vehicle can serve as both the constitutions for anti-surge measures and the on/off operation on the load side.

It should be noted that although the present invention has been described by showing the constitutions of the above-described embodiments as examples, the present invention is not limited to these embodiments, and it is obvious that various improvements and changes in design are possible in other constitutions unless the outline of the present invention is not deviated. For example, the constitution in which the constant voltage circuit and the storage means are connected via the control means has been shown, but the effects similar to those produced by the above-described embodiments can be obtained even by a constitution in which the storage means (for example, SRAM) directly retains memory by means of the drive voltage from the constant voltage circuit, not via control means.

Moreover, the NPN transistor may be replaced with an N-channel FET, and the PNP-type transistor may be replaced with the P-channel FET in the constitutions of the above-described embodiments. Moreover, the Zener diode and the resistor may be interchangeably positioned, which can produce effects similar to those produced by the above-described embodiments.

INDUSTRIAL APPLICABILITY

The present invention relates to a power supply of an in-vehicle electric device, and can be applied as, for example, a power supply of a meter for vehicles mounted on automobiles, motorcycles and moving bodies provided with farm machines and construction machines.

DESCRIPTION OF REFERENCE NUMERALS 1 switching circuit
1a NPN-type transistor
1b, 1c, 1e, 2b, and 2d resister
1d P-channel FET
2 surge cut circuit
2a Zener diode
2c NPN-type transistor
2e PNP-type transistor
constant voltage circuit
4 control means
5 storage means (storage medium)
6 display means
10 switching circuit
10a P-channel FET
20 surge cut circuit
20a Zener diode
a power source line
b input line
c connecting line (output line)
f feedback line.

The invention claimed is:

1. A power supply circuit for vehicle comprising:
   a constant voltage circuit which is connected to a battery mounted on a vehicle and outputs a predetermined voltage;
   a surge cut circuit provided with a Zener diode and a transistor for protecting the constant voltage circuit;
   a switching circuit which switches an output to the constant voltage circuit on and off between the constant voltage circuit and the surge cut circuit; and
   a feedback line which connects an output line of the switching circuit and the Zener diode, wherein
   the constant voltage circuit applies a voltage to a load circuit which includes a storage medium storing setting information about the vehicle, the setting information being externally set by a user, and
   the constant voltage circuit and the storage medium are connected via a controller which operates based on the voltage provided from the constant voltage circuit.

2. The power supply circuit for vehicle according to claim 1, wherein the switching circuit performs the switching on and off based on the operation of a start-up switch of the vehicle.

* * * * *